(12) United States Patent
Lock et al.

(10) Patent No.: US 10,392,248 B2
(45) Date of Patent: Aug. 27, 2019

(54) DRY GRAPHENE TRANSFER FROM METAL FOILS

(71) Applicant: The Government of the United States of America, as represented by the Secretary of the Navy, Arlington, VA (US)

(72) Inventors: Evgeniya H. Lock, Annandale, VA (US); Mira Baraket, Washington, DC (US); Scott G. Walton, Fairfax, VA (US); Matthew Laskoski, Springfield, VA (US); Paul E. Sheehan, Springfield, VA (US); Shawn P. Mulvaney, Washington, DC (US); Daniel R. Hines, College Park, MD (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/018,682

(22) Filed: Jun. 26, 2018

(65) Prior Publication Data

US 2018/0305202 A1    Oct. 25, 2018

Related U.S. Application Data

(62) Division of application No. 13/426,855, filed on Mar. 22, 2012, now abandoned.

(Continued)

(51) Int. Cl.
*C01B 32/186*        (2017.01)
*C01B 32/194*        (2017.01)
(Continued)

(52) U.S. Cl.
CPC ............... *B82Y 40/00* (2013.01); *B82Y 30/00* (2013.01); *C01B 32/186* (2017.08);
(Continued)

(58) Field of Classification Search
CPC ... C01B 32/182; C01B 32/184; C01B 32/186; C01B 32/188; C01B 32/19;
(Continued)

(56) References Cited

U.S. PATENT DOCUMENTS 5,236,636 A * 8/1993 Tisack ............... B29C 45/0053
                                                    264/102
6,436,481 B1 * 8/2002 Chabrecek ............. A61L 27/34
                                                    427/488

(Continued)

*Primary Examiner* — William P Fletcher, III
*Assistant Examiner* — Nga Leung V Law
(74) *Attorney, Agent, or Firm* — US Naval Research Laboratory; Rebecca L. Forman

(57) ABSTRACT

A method for dry graphene transfer comprising growing graphene on a growth substrate, chemically modifying a transfer substrate to enhance its adhesion to graphene, contacting the graphene on the growth substrate with the transfer substrate and transfer printing; and separating the transfer substrate with attached graphene from the growth substrate. The growth substrate may be copper foil. The transfer substrate may be a polymer, such as polystyrene or polyethylene, or an inorganic substrate.

11 Claims, 8 Drawing Sheets

Related U.S. Application Data

(60) Provisional application No. 61/466,248, filed on Mar. 22, 2011.

(51) Int. Cl.
*B82Y 40/00* (2011.01)
*B82Y 30/00* (2011.01)

(52) U.S. Cl.
CPC ..... *C01B 32/194* (2017.08); *Y10T 428/31507* (2015.04); *Y10T 428/31786* (2015.04); *Y10T 428/31931* (2015.04)

(58) Field of Classification Search
CPC ... C01B 32/192; C01B 32/194; C01B 32/196; C01B 32/198; Y10T 428/31507; Y10T 428/31786; Y10T 428/31931; B05D 3/142; B05D 3/148
See application file for complete search history.

(56) References Cited

U.S. PATENT DOCUMENTS

| | | | | |
|---|---|---|---|---|
| 2010/0028559 | A1* | 2/2010 | Yan | B82Y 25/00 |
| | | | | 427/558 |
| 2010/0035074 | A1* | 2/2010 | Cohen | B05D 1/62 |
| | | | | 428/500 |
| 2011/0048625 | A1* | 3/2011 | Caldwell | B82Y 30/00 |
| | | | | 156/233 |

* cited by examiner

DRY GRAPHENE TRANSFER FROM METAL FOILS

CROSS-REFERENCE TO RELATED APPLICATIONS

This application is a divisional application of U.S. application Ser. No. 13/426,855 filed on Mar. 22, 2012 by Evgeniya H. Lock et al., entitled "Dry Graphene Transfer from Metal Foils," which was a nonprovisional application claiming the benefit of U.S. Provisional Application 61/466,248 filed on Mar. 22, 2011 by Evgeniya H. Lock et al., entitled "Dry Graphene Transfer to Polymers," the entire contents of both applications are incorporated herein by reference.

FIELD OF THE INVENTION

The present invention relates generally to graphene transfer and more specifically to dry graphene transfer from metal foils.

BACKGROUND OF THE INVENTION

Interest in organic electronics comes from the low cost of plastics, and the relative ease of organic compounds processing with most successful application in organic light-emitting devices (OLEDs), thin-film transistors (TFTs) and thin film organic photovoltaic cells. See, e.g., S. R. Forrest, *The path to ubiquitous and low-cost organic electronic appliances on plastic*, Nature, 428, 911-918 (2004); C. D. Sheraw et al., *Organic thin-film transistor-driven polymer-dispersed liquid crystal displays on flexible polymeric substrates*, Appl. Phys. Lett., 80(6), 1088-1090 (2002); D. R. Hines et al., *Nanotransfer printing of organic and carbon nanotube thin-film transistors on plastic substrates*, Appl. Phys. Lett., 86, 163101 (2005); and H. Hoppe et al., *Organic solar cells: an overview*, J. Mater. Res., 19(7), 1924-1945 (2004), the entire contents of each are incorporated herein by reference. Flexible electronic devices typically rely on the conducting properties of small molecules, conductive polymers and biological materials. However, their inherent low carrier mobilities (<1 $cm^2V^{-1} s^{-1}$), low electrical conductivity ($\sigma \sim 10^{-6}$ S $cm^{-1}$) and low charge carrier velocity (10 cm $s^1$) represent serious limitation and underlines the need of perfect transparent conductor that will possess both the flexibility of organics and higher carrier mobilities. Graphene has emerged as this long sought conductor due to its zero-band gap, extremely high electron mobilities of 10,000-70,000 $cm^2V^{-1} s^{-1}$, and low absorption (2.3%) in the visible spectrum. See, e.g., W. Warta et al., *Ultrapure, high mobility organic photoconductors*, Appl. Phys. A, 36, 163-170 (1985); P. E. Burrows et al., *Electroluminescence from trap-limited current transport in vacuum deposited organic light emitting devices*, Appl. Phys. Lett., 64, 2285-2287 (1994); F. Schwierz, *Graphene transistors*, Nature Nanotechnol., 5, 487-496 (2010); and F. Bonaccorso et al., *Graphene photonics and optoelectronics*, Nature photonics, 4, 611-622 (2010), the entire contents of each are incorporated herein by reference. Successful graphene incorporation into plastics shows promise in the production of flexible touch screens, displays, smart windows as well as a viable replacement for ITO technology. See, e.g., J. K. Wassei et al., *Graphene, a promising transparent conductor*, Materials today, 13(3), 52-59 (2010); L. G. D. Arco et al., *Continuous, highly flexible, and transparent graphene films by chemical vapor deposition for organic photovoltaics*, ACS Nano, 4(5), 2865-2873 (2010); and P. Matyba et al., *Graphene and mobile ions: the key to all-plastic, solution processed light-emitting devices*, ACS Nano, 4(2), 637-642 (2010), the entire contents of each are incorporated herein by reference. However, a truly manufacturable process in any of the above mentioned applications requires controlled, uniform graphene growth and precise graphene placement on top of organic surfaces, along with the development of cost-effective techniques for organic device fabrication.

High-quality graphene is typically produced via thermal graphitization of SiC, or chemical vapor deposition (CVD) on metals substrates, with the latter showing the most promise for lower cost and scalability to large areas. See, e.g., X. Li et al., *Large-area synthesis of high-quality and uniform graphene films on copper foils*, Science, 324, 1312-1314 (2009) and S. Bae et al., *Roll-to-roll production of 30-inch graphene films for transparent electrodes*, Nature Nanotechnol., 5, 574-578 (2010), the entire contents of each is incorporated herein by reference. For device fabrication, graphene has to be transferred to semiconductor or plastic substrates. Typically, the graphene transfer procedure involves using a polymer mediator (PMMA or PDMS) to keep the graphene film intact and prevent folding while the Cu foil is chemically etched. The latter requires strong acids such as $HNO_3$, which often produces hydrogen bubbles and damages the graphene. See, e.g., W. Regan et al., *A direct transfer of large-area graphene*, Appl. Phys. Lett., 96, 113102 (2010) and K. S. Kim et al., *Large-scale pattern growth of graphene films for stretchable transparent electrodes*, Nature, 457, 706-710 (2009), the entire contents of each is incorporated herein by reference. Aqueous iron chloride ($FeCl_3$) has been explored as a mild alternative to acid etching, but the metal foil etching step is a hazardous and time consuming process that can take up to twelve hours to complete. See, e.g., V. P. Verma et al., *Large-area graphene on polymer film for flexible and transparent anode in field emission device*, Appl. Phys. Lett., 96, 203108 (2010), the entire contents of which are incorporated herein by reference. Extensive soaking of the graphene/PMMA stack in deionized water is needed for the removal of the etchant's residuals. This step may also take hours. After the metal foil is dissolved, the graphene/PMMA stack is placed onto an arbitrary surface and the polymer mediator is dissolved in acetone to yield "pristine" graphene on semiconductor or polymer substrate. The detrimental effect of the polymer solvent residues in graphene has been recognized and include introduction of variety of defects into the graphene layer. Thus, alternative approaches to the use of polymer substrate as a mediator mainly involving thermal release tape have been explored. See, e.g., J. D. Caldwell et al., *Technique for the dry transfer of epitaxial graphene onto arbitrary substrates*, ACS Nano, 4(2), 1108-1114 (2010); Y.

Lee et al., *Wafer-scale synthesis and transfer of graphene films*, Nano Lett., 10, 490-493 (2010); and L. Song et al., *Transfer printing of graphene using gold film*, ACS Nano, 3(6), 1353-1356 (2009), the entire contents of each are incorporated herein by reference. As an example, the protocol used by Bae et al. involves placing tape/graphene/Cu stack between two rollers at 0.2 MPa pressure, then the Cu foil is chemically etched. The Gr/tape stack is washed with diionized water and placed on target substrate. Gr/tape/substrate is exposed to mild heat (90-120° C.) to remove tape residues. While the protocol for transfer varies between research groups, the metal foils are always chemically etched, which is time consuming, the graphene film is altered by the exposure to chemicals, the metal substrates are destroyed and hazardous chemical waste is generated—none of which is desirable for a large scale device production.

BRIEF SUMMARY OF THE INVENTION

The aforementioned problems are overcome in the present invention which provides a method for dry graphene transfer comprising growing graphene on a growth substrate, chemically modifying a transfer substrate to enhance its adhesion to graphene, contacting the graphene on the growth substrate with the transfer substrate and transfer printing; and separating the transfer substrate with attached graphene from the growth substrate. The growth substrate may be copper foil. The transfer substrate may be a polymer, such as polystyrene or polyethylene, or an inorganic substrate. Also disclosed is the related composite material made by this process.

These and other features and advantages of the invention, as well as the invention itself, will become better understood by reference to the following detailed description, appended claims, and accompanying drawings.

DETAILED DESCRIPTION OF THE INVENTION

The present invention is directed towards a method of dry graphene transfer from a growth substrate (for example but not limited to copper foil, silicon carbide, boron nitride, etc.) to a transfer substrate, which may a polymer (for example but not limited to oxygen containing polymers, nitrogen containing polymers, esters, etc.) or an inorganic substrate (for example but not limited to oxides, nitrides, metals, silicon, and silicon oxide). In a preferred embodiment, the transfer substrate is polystyrene or polyethylene. One preferred embodiment relies on the differential adhesion between the growth substrate and the transfer substrate against the graphene layer. Thus, when the graphene-transfer substrate cohesive strength is higher than that of the graphene-growth substrate, a successful print is observed. This straightforward approach eliminates damage to the graphene associated with wet chemical transfer techniques, reduces the transfer time and preserves the metal foil substrates.

Figure 1:
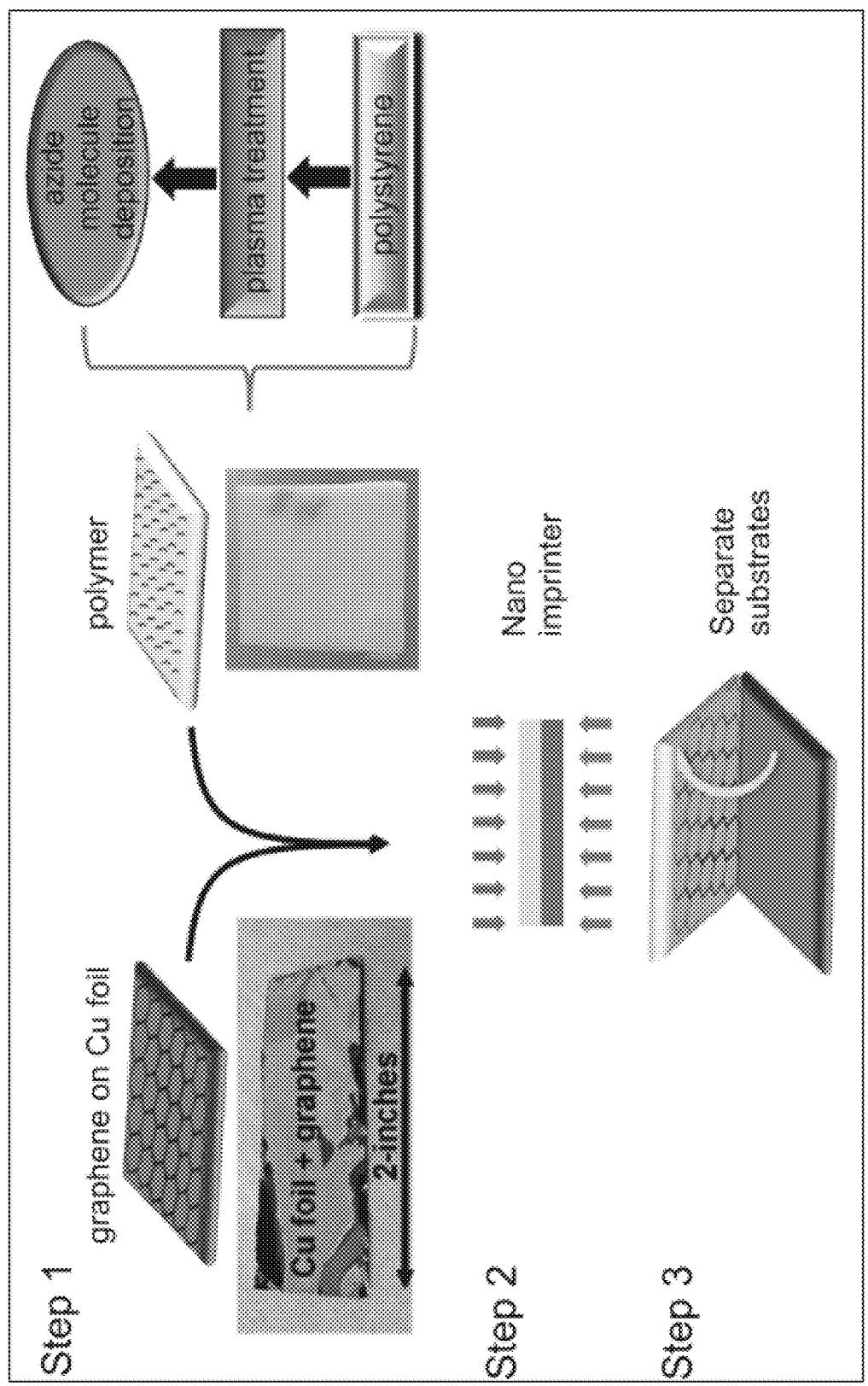
FIG. 1 is a flow chart of the transfer process. In step 1, graphene film was grown on Cu foil and independently the polymer surface was treated to increase reactivity. In step 2, both substrates were placed in a NX 2000Nano Imprinter. In step 3, the substrates were separated and graphene was transferred to the polymer.

The method of dry graphene transfer relies on three distinct steps as shown in FIG. 1. In the first step, graphene was grown via CVD on a Cu foil and separately, the polymer surface was treated to enhance its adhesion to graphene. The latter process involved plasma-based surface activation and the deposition of N-ethylamino-4-azidotetrafluorobenzoate (TFPA-$NH_2$) linker molecule. Instead of a polymer, the same two step process could be applied for surface preparation of inorganic substrates, including $SiO_2$, $Al_2O_3$, GaN and SiC, provided the plasma treatment and the end functional group of the azide linker molecule are precisely adjusted. In this case the plasma treatment should be in gas producing hydroxyl (OH) and/or carboxyl (COOH) functional groups or amines ($NH_2$) and the azide molecule should have a phosphate end group.

In the second step, the TFPA treated polymer surface was placed in contact with graphene covered Cu foil and printed, under heat and pressure, in a NX 2000 Nano Imprinter. In the final step, the polymer substrate with attached graphene was separated from the metal foil. To ensure successful transfer, the adhesion on two interfaces polymer/TFPA and TFPA/graphene has to be higher than the adhesion between graphene and Cu. Each step is described in detail in the following sections.

Step 1: Graphene Growth on Cu and Polymer Surface Preparation

Graphene was grown on Cu foils following procedure outlined by X. Li et al., *Large-area synthesis of high-quality and uniform graphene films on copper foils*, Science, 324, 1312-1314 (2009). The developed dry graphene transfer process relies on the differential adhesion between graphene/growth substrate and the receiving substrate. If the bond strength between graphene and the receiving substrate is high enough compared to the van der Waals graphene/metal foil interactions, graphene can be transferred to any substrate. Thus, the key for graphene transfer is the polymer surfaces preparation prior transfer print. The polymers of choice are polystyrene (PS) and polyethylene (PE) because of simplicity of their chemical structure containing only carbon and hydrogen and in the same time providing us with insight of the how important are the aromatic domains of polystyrene vs. the aliphatic polymer chains of polyethylene. Polystyrene was purchased from Tekra, while the ultra-high molecular weight polyethylene was purchased from Goodfellow. Also, it should be taken into account that polystyrene is an amorphous polymer with randomly oriented domains, whereas ultra-high molecular weight polyethylene has crystalline domains that are embedded into the amorphous matrix.

Plasma Treatment

Polystyrene and polyethylene are chemically inert and so their surfaces must be chemically modified prior to TFPA molecule attachment. Plasma-based functionalization was chosen because it enables the incorporation of a variety of chemically reactive moieties (E. H. Lock et al., *Surface composition, chemistry and structure of polystyrene modified by electron-beam-generated plasma*, Langmuir, 26(11), 8857-8868 (2010), the entire contents of which is incorporated herein by reference). In this case electron beam-generated plasma was used to introduce oxygen functional groups such as hydroxyls, carboxyls, and carbonyls. The plasma can produce OH, COOH, a combination of OH and COOH, or $NH_2$ groups on the surface.

The electron beam was produced by applying a −2 kV pulse to a linear hollow cathode for a selected pulse width and duty factor. The emergent beam passed through a slot in a grounded anode and was then terminated at a second grounded anode located further downstream. The electron beam volume between the two anodes defines the ionization source volume, with the dimensions set by the slot size (1×25 $cm^2$) and the anode-to-anode length (40 cm). Beam spreading from collisions with the background gas was suppressed by a co-axial magnetic field (150 Gauss) produced by a set of external coils. Because the beam is collimated, few high energy electrons strike the surface of the material. The system vacuum was maintained by a 250 l/s turbo pump, with a base pressure of $5\times10^{-6}$ Torr. The operating pressure was achieved by introducing $CO_2$ (purity >99.995%) through the mass flow controllers and throttling the pumping speed using a manual gate valve. The samples were placed on a 10.2 cm diameter stage located at 2.5 cm from the nominal edge of the electron beam. The stage was held at ground potential and room temperature. Polymers were treated at a pressure of 100 mTorr, treatment time of 1 minute and duty factor of 10%.

Figure 2:
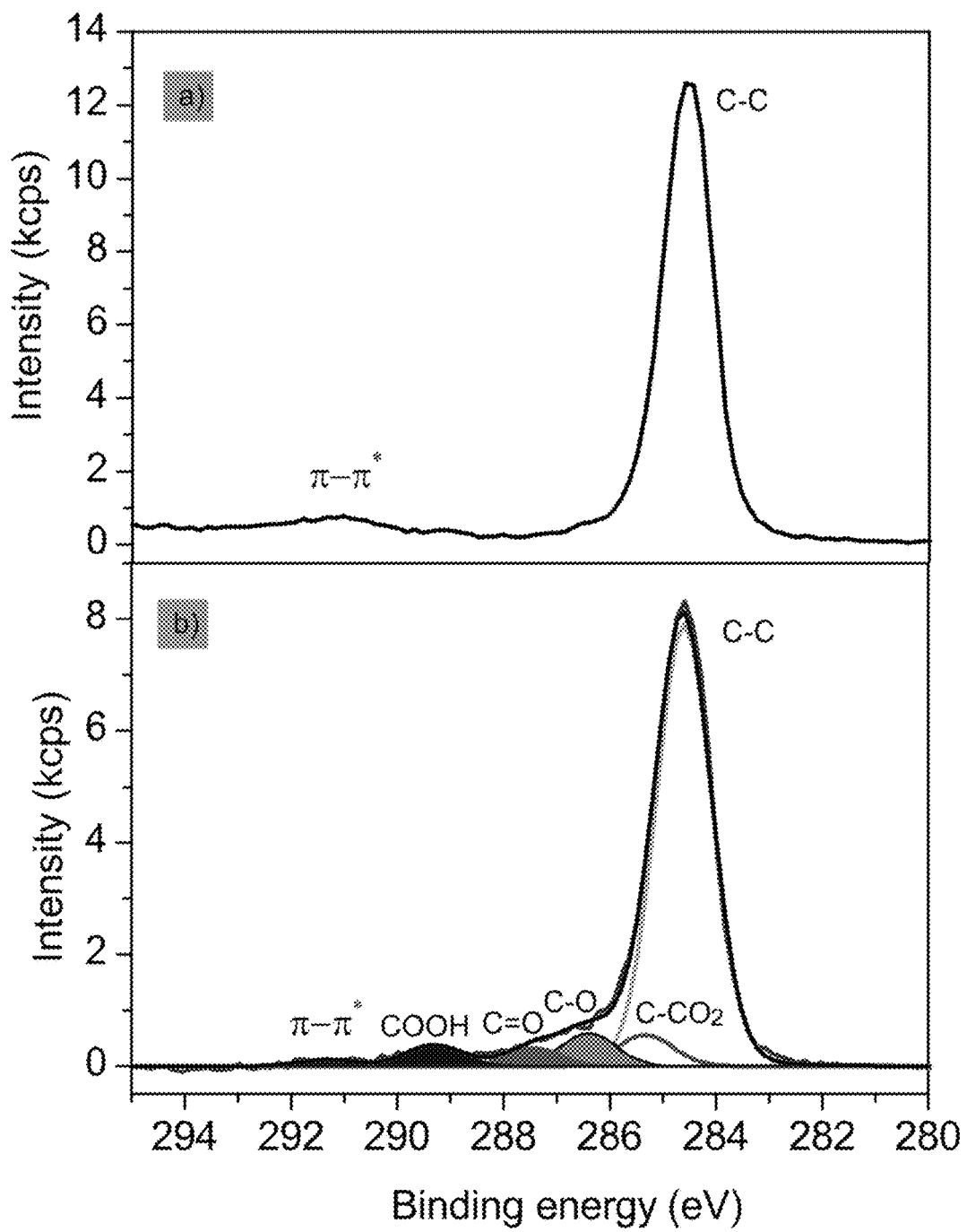
FIG. 2 shows high-resolution C1s region of polystyrene (PS-H) before and after plasma exposure.
Figure 3:
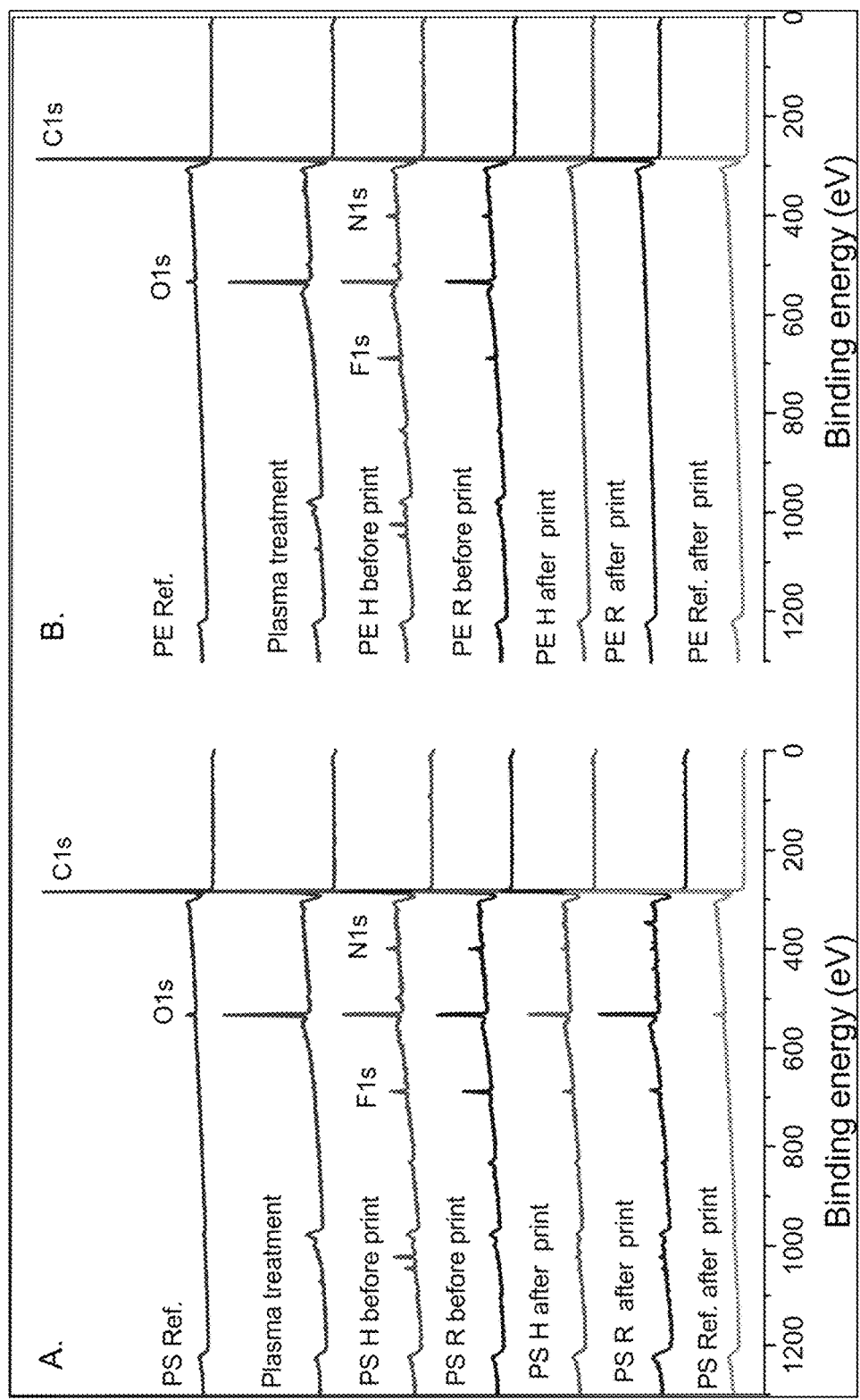
FIG. 3 shows XPS survey spectra of every step of the polymer preparation before print and the corresponding spectra after print.
Figure 4:
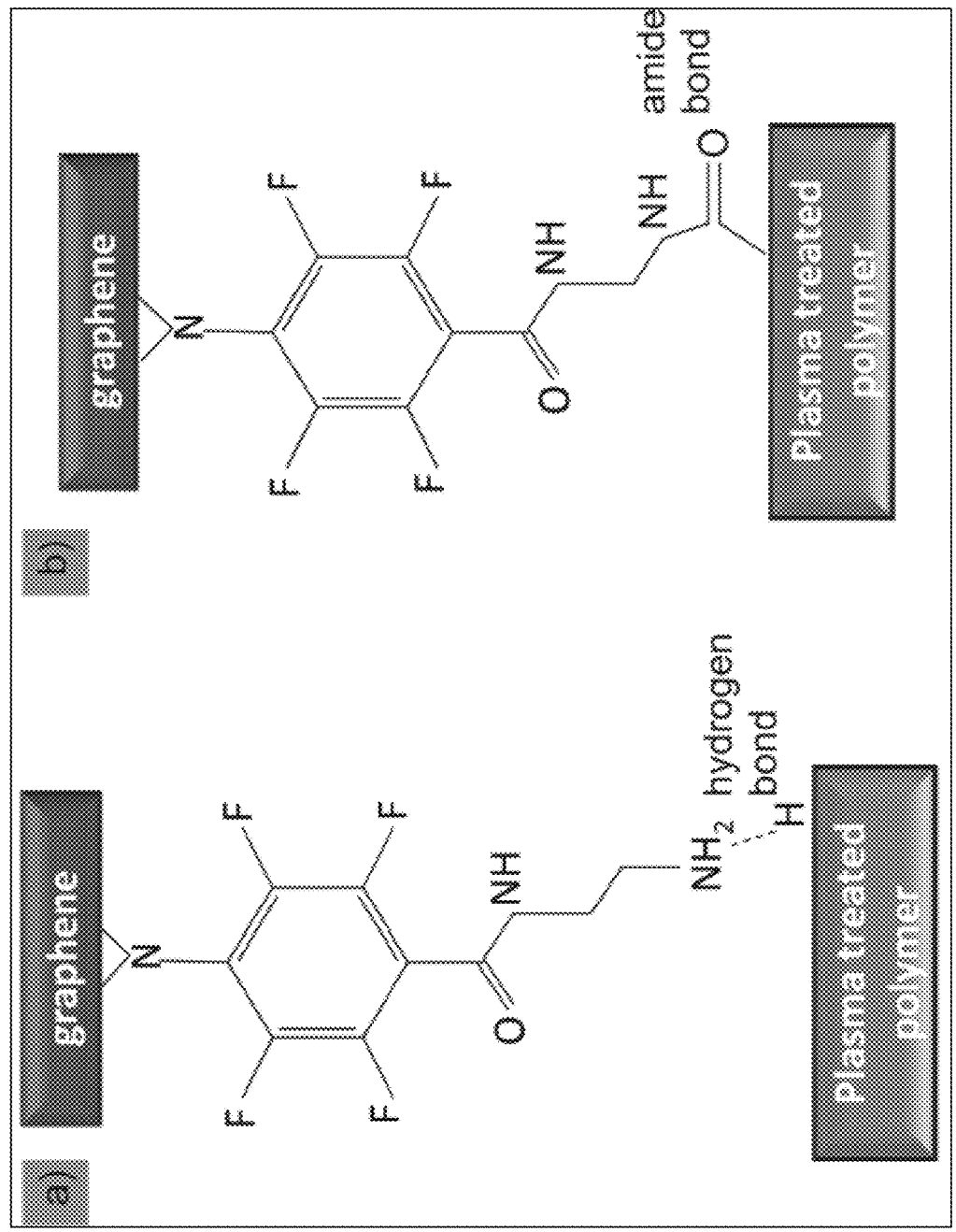
FIG. 4 is an attachment schematic: a) hydrogen bond attachment between the amine groups of the TFPA and the hydroxyls and carboxyl groups of the plasma treated polystyrene surface and b) covalent bond attachment between TFPA and the plasma treated polystyrene surface. To form an amide bond the carboxyl groups on the polymer surface were reacted with NHS-EDC chemistry prior to TFPA deposition.

After $CO_2$ plasma high oxygen incorporation was detected. In the case of polystyrene and polyethylene the amounts were 17 at. % and 15 at. % respectively (FIG. 3, Table I). A closer look in the C1s region revealed that multiple types of oxygen functionalities were incorporated into the polymer structure for both polymers including hydroxyls (C—O), carbonyls (C=O), carboxyls (COOH) and carbonates ($CO_3$) in different ratios with the highest concentration of hydroxyls (FIG. 2, Tables II, III).

TABLE I

Elemental composition of polymer surfaces before and after print

| Element (at. %) | References | | Plasma treatment | | Polymers before print | | | | Polymers after print | | | | | |
|---|---|---|---|---|---|---|---|---|---|---|---|---|---|---|
| | PS | PE | PS | PE | PS H | PS R | PE H | PE R | PS H | PS R | PS Ref. | PE H | PE R | PE Ref. |
| C1s | 97.13 | 95.53 | 82.89 | 84.84 | 79.71 | 81.05 | 81.16 | 86 71 | 87.99 | 83.89 | 9.7 | 99.61 | 98.73 | 100 |
| O1s | 2.87 | 4.47 | 17.10 | 15.06 | 12.04 | 11.26 | 12.77 | 9.81 | 9.75 | 12.73 | 3.3 | 0.39 | 1.27 | 0 |
| N1s | ND | ND | ND | ND | 4.17 | 3.97 | 3.19 | 2.03 | 1.11 | 1.35 | ND | ND | ND | ND |
| F1s | ND | ND | ND | ND | 3.9 | 3.73 | 2.87 | 1.46 | 1.52 | 2.09 | ND | ND | ND | ND |

ND, not detected.

A closer look in the C1s region (Tables II, III) reveals that multiple types of oxygen functionalities were incorporated into the polymer structure for both polymers including hydroxyls (C—O), carbonyls (C=O), carboxyls (COOH) and carbonates ($CO_3$) in different ratios. Whereas the concentration of hydroxyls is the highest (4.62 at. % for PS; 5.27 at. % for PE) for both polymers, the presence of other oxygen functionalities was polymer specific. For polystyrene, carbonyls and carbonates had approximately equal concentrations of 2 at. % and carboxyl concentration is 1 at. %. For polyethylene, carbonyl (3.13 at. %) and carboxyls (3.53 at. %) concentrations were comparable. The samples also contained 1.5 at. % of carbonate. After plasma treatment due to substitution into the benzene rings the $\pi$-$\pi$* feature characteristic for benzene rings organization on the surface is reduced by a factor of three.

precipitate that had formed filtered using a Buchner funnel. To the filtrate was added 100 mL chloroform and washed with water (3×50 mL) and dried over magnesium sulfate. The solvent was removed in vacuo and the solid was vacuum dried to yield 1 (1.25 g, 75%) as a yellow solid. $^1$H-NMR (300 MHz, $CDCl_3$): δ 6.64 (br, 1H), 3.45 (m, 2H), 2.92 (m, 2H). $^{13}$C-NMR (75 MHz, $CDCl_3$): δ 168.61, 160.25, 25.63.

For successful graphene transfer, there should be a uniform monolayer of TFPA-$NH_2$ that is properly oriented. That is the $NH_2$-end group should be attached to the polymer and the azide end group is attached to graphene. This is ensured since the azide end group of TFPA-$NH_2$ molecule is only activated via heat (T>140° C.) or UV exposure and thus will not react with the plasma activated polymer surface during deposition.

TABLE II

C1s high resolution spectra analysis of polystyrene

| Group | PS Ref. | Plasma treatment | Before Print | | After print | | |
|---|---|---|---|---|---|---|---|
| | | | PS H | PS R | PS H | PS R | PS Ref. |
| C—C, $sp^2$ | 92.13 | 60.51 | 58.11 | 61.68 | 69.96 | 62.99 | 88.90 |
| C—$CO_2$ (C—N) | | 11.63 | 10.0 | 9.16 | 8.71 | 9 | — |
| C—O (C=N) (C—CF) | 1.76 | 4.62 | 5.88 | 4.87 | 4.44 | 6.06 | 3.08 |
| C=O (C—F) | — | 1.98 | 3.22 | 3.21 | 2.25 | 2.99 | — |
| COOH (O=C=N) | — | 0.99 | 2.35 | 1.7 | 1.64 | 1.9 | — |
| $CO_3$ | — | 2.01 | — | — | — | — | — |
| $\pi$-$\pi$* ($CF_2$) | 3.24 | 1.17 | 1.2 | 1.23 | 1 | 0.97 | 4.71 |
| C (total) | 97.13 | 82.89 | 80.77 | 81.85 | 87.99 | 83.89 | 96.70 |

TABLE III

C1s high resolution spectra analysis of polyethylene

| Group | PE Ref. | Plasma treatment | Before Print | | After print | | |
|---|---|---|---|---|---|---|---|
| | | | PE H | PE R | PE H | PE R | PE Ref. |
| C—C, $sp^2$ | 92.37 | 54.98 | 55.86 | 67.06 | 89.13 | 89.42 | 91.74 |
| C—$CO_2$ (C—N) | — | 16.55 | 12.19 | 11.21 | 8.49 | 6.94 | 6.4 |
| C—O (C=N) (C—CF) | 3.16 | 5.27 | 5.48 | 4.10 | 1.99 | 2.37 | 1.86 |
| C=O (C—F) | — | 3.13 | 4.34 | 3.11 | — | — | — |
| COOH (O=C=N) | — | 3.53 | 3.30 | 1.24 | — | — | — |
| $CO_3$ | — | 1.48 | — | — | — | — | — |
| C (total) | 95.53 | 84.94 | 81.16 | 86.71 | 99.61 | 98.73 | 100 |

TFPA Molecule Attachment

The azide molecule used in this study TFPA-$NH_2$ is soluble in methanol, and can thus be used with a large variety of organic substrates. It was synthesized as follows. All starting materials were of reagent grade and used without further purification. N-succinimidyl-4-azidotetrafluorobenzoate was synthesized from a previously published procedure. $^1$H-NMR was performed on a Brüker ADVANCE 300 spectrometer. N-ethylamino-4-azidotetrafluorobenzoate (1): To a 250 mL round bottom was added ethylenediamine (6.36 g, 105.8 mmol) and 100 mL acetonitrile. The mixture was cooled to 0° C. and (N-succinimidyl-4-azidotetrafluorobenzoate (2.00 g, 6.02 mmol) in 25 mL acetonitrile was added dropwise over 20 min. The reaction was stirred at 0° C. for an additional 1 h and the white To explore bond strength requirements at the TPFA/polymer interface, two different attachment protocols were developed. In the first approach, the TFPA molecule was attached to the plasma functionalized polymer surfaces via its amine end group to carboxyl and hydroxyl groups on the basis of hydrogen bond (FIG. 3a, heron referred to as PS-H) by placing the samples in 4 mM TFPA solution for two hours, then the surfaces were extensively rinsed and sonicated for 10 minutes in methanol and finally dried with nitrogen. In the second, the carboxyl groups present on the polymer surface were reacted with EDC/NHS to form a covalent amide bond between the TFPA and the polymer (FIG. 3b, heron referred to as PS-R). Ethyl-3-[3-dimethylaminopropyl]carbodiimide hydrochloride (EDC) and N-hydroxysuccinimide (NHS) were purchased from Thermo Fisher Scientific. 2-[morpholino]ethanesulfonic acid (MES), NaCl, and sodium phosphate were purchased from Sigma Aldrich. Activation buffer was composed of 0.1 M MES, 500 mM NaCl, and the pH was adjusted to 6.0. Coupling buffer was made from 100 mM sodium phosphate, 150 mM NaCl, and the PH was adjusted to 7.2. A solution of EDC (2 mM) and NETS (5 mM) in activation buffer was freshly prepared prior to each reaction. Approximately 200 µl of the EDC/NHS solution was drop coated over the carboxyl terminated substrates. After 15 min for reaction, excess EDC/NHS was removed by rinsing with copious amounts of coupling buffer. The dip coating procedure was the same as in Scheme 1 and it included placing the samples in 4 mM TFPA solution for two hours, then the surfaces were extensively rinsed and sonicated for 10 minutes in methanol and finally dried with nitrogen.

For proper azide group alignment and reduction of unreacted and loosely connected molecule, the sonication and rinsing steps are critical. In fact, if the sonication step is omitted, the azide coverage and thus the transferred graphene coverage are reduced. To ensure successful transfer, fluorine and nitrogen need to be incorporated onto the polymer surface. After transfer, the levels of these two elements decrease.

Elemental X-ray photoelectron spectroscopy (XPS) analysis of TFPA coated polystyrene and polyethylene using both attachment schemes reveals nitrogen and fluorine incorporation in all cases. However, the level of incorporation is different—in the case of polystyrene both PS H and PS R samples before print contain approximately 4 at. % of nitrogen and 4 at. % fluorine (Table I). In the case of polyethylene PE H contains 3 at. % of nitrogen and 2.9 at. % of fluorine, PER contains 2 at. % of nitrogen and 1.5 at. % of fluorine (Table I). These lower numbers suggest lower TFPA coverage on polyethylene in comparison with polystyrene. Proper interpretation of the group distribution on the polymer surface after PFPA deposition is difficult because different chemical groups e.g. C—O, C=N, C—CF; C=O, C—F and COOH, O=C=N (see Tables II, III) overlap in the spectrum.

Step 2: Transfer Printing

The TFPA coated polymer substrates were brought into contact with a graphene covered Cu foil at a pressure of 3.4 MPa and heated to 150° C. for 30 minutes. The azide-end of the TFPA molecule was activated and a covalent azide bond between the graphene and the TFPA was formed. It should be noted that these transfer print conditions were not optimized. The same results might be achieved with pressure much lower than 3.4 MPa. Also the TFPA-$NH_2$ molecule could be UV activated. As a control, unmodified PS and polyethylene PE substrates (hereon referred to as PS ref and PE Ref) were also printed against graphene on Cu foil.

Step 3: Separation of Polymer and Cu Foil

After printing, the polymer substrates were separated from the Cu foil.

To evaluate the quality of the transferred graphene onto polystyrene and polyethylene substrates Raman spectroscopy and Microraman imaging were performed. Raman spectra were acquired using a Renishaw InVia Raman microscope with a constant power of 20 mW of power, and exposure time of 20 seconds. A Horiba, LabRAM ARAMIS Confocal Raman microscope equipped with 532 nm laser was used for the microraman maps. The microscope was calibrated to the 520.7 $cm^{-1}$ peak of a silicon (111) wafer to within ±2 $cm^{-1}$ prior to each measurement. All measurements used an exposure time of 10 seconds and were averaged over two exposures. The spot size of the laser when focused on the sample surface is approximately 1 µm. The DuoScan feature of the ARAMIS microscope was used to raster the laser spot over a 2 µm square. A general bandwidth of 100 $cm^{-1}$ for polystyrene centered at the peak maximum with the baseline removed was used for integration. Peak selection and integration was preformed with LabSpec 5 version 5.55.10 software provided by Horiba Scientific. The Cu foil residuals were analyzed as well. The electrical properties of both polymers before and after transfer were evaluated via sheet resistance measurements.

After graphene transfer print to polystyrene and polyethylene as shown in FIG. 3, the concentration of N and F in PS H and PS R was significantly reduced and these elements were undetectable for PE H and PE R. In the same time the total amount of carbon on the both polymers was increased suggesting that deposition onto the polymer surfaces occurred. Raman spectra (FIG. 5) show appearance of 2D peak at 2686 $cm^{-1}$ for PS H and PS R and G peak at 1586 $cm^{-1}$ for PE H and PE R signifying graphene presence onto the polymer surface. In the G-region polystyrene has inherent peak at 1586 $cm^{-1}$, however after transfer the relative peak intensity was increased. In 2D region, polyethylene has inherent peak, however after transfer the peak became doubled shouldered (first shoulder at 2686 $cm^{-1}$) due to graphene incorporation.

In some areas graphene was transferred to polystyrene and polyethylene references. After graphene print to PS ref the total amount of oxygen was unchanged, however closer look in the C1s region revealed that the concentration of π-π* feature characteristic for benzene rings present on the surface was increased from 3 at. % to ca. 5 at. % (Table II). This could only occur due to graphene deposition. When graphene was printed onto polyethylene reference the small amount of oxygen present onto the polymer surface was completely undetectable (Table III). Raman spectra (FIG. 5) also confirm the transfer for PS ref and PE ref. XPS analysis of the Cu foil before and after print to both polymer substrates (Table IV) show an increase in oxygen concentration approximately by a factor of five and reduction in Cu concentration approximately by a factor of two. These results thus suggest that graphene was removed from the Cu foil.

TABLE IV

Elemental composition of Cu foil before and after transfer.

| Element | Graphene on Cu foil | Gu foil After Print to polystyrene | | | Cu foil after print to polyethylene | | |
|---|---|---|---|---|---|---|---|
| | | PS H | PS R | PS REF | PE H | PE R | PE Ref |
| C1s | 51.69 | 58.40 | 46.36 | 56.20 | 54.53 | 59.18 | 52.12 |
| O1s | 4.87 | 21.98 | 25.44 | 22.07 | 18.86 | 20.04 | 23.94 |
| Cu2p | 43.45 | 19.62 | 28.20 | 21.74 | 26.61 | 20.79 | 21.52 |

Figure 6:
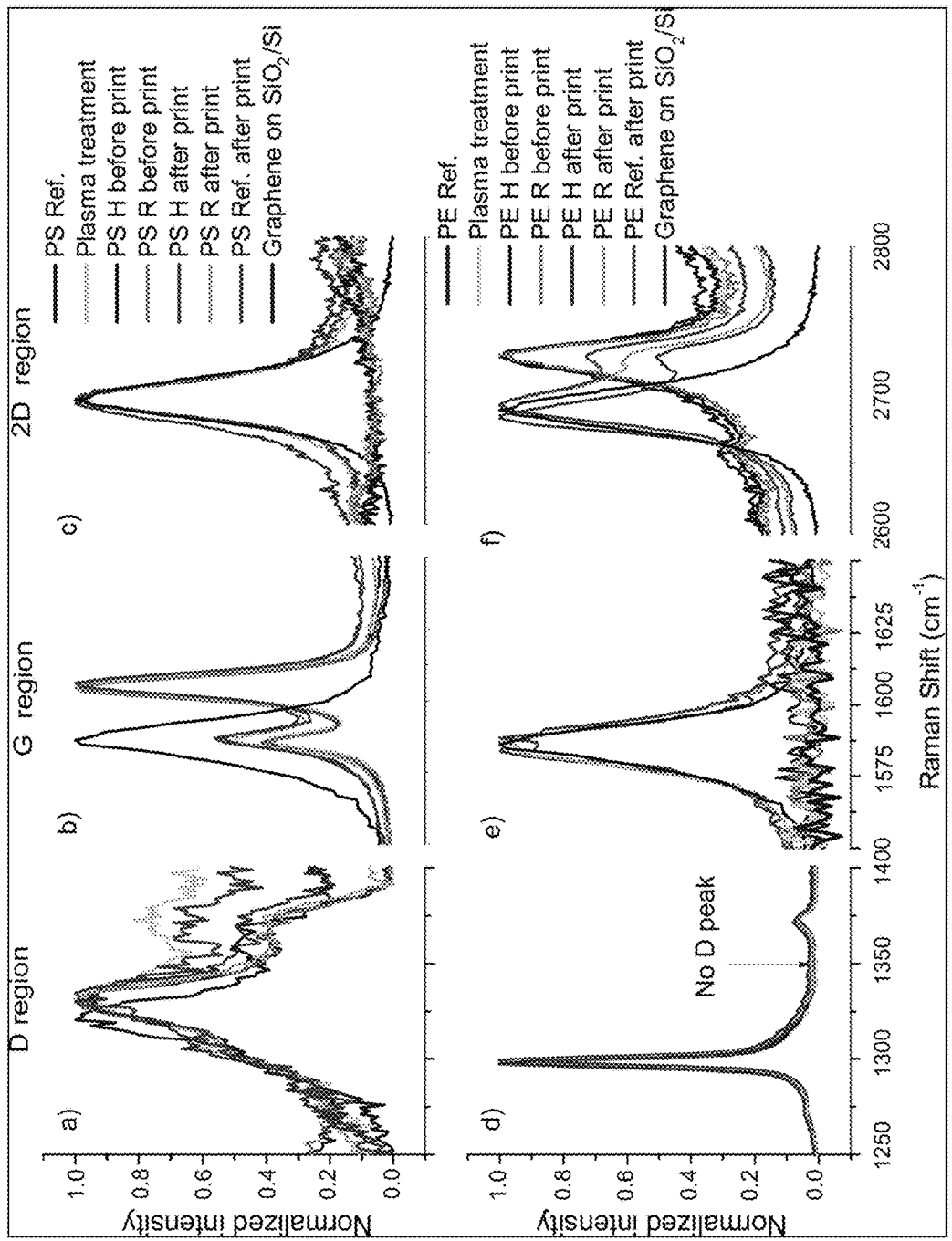
FIG. 6 shows Raman spectra of D, G and 2D regions of polystyrene (a-c) and polyethylene (d-f) before and after print.

A more careful investigation of the three significant regions in graphene identification G and 2D showing ordered graphitic structure and D region showing defects in the graphene structure (FIG. 6) suggests high quality monolayer transfer based on peak positions and peak width (<30 cm$^{-1}$). A closer look at D region shows that no defects were introduced during transfer, i.e. no peaks at 1350 cm$^{-1}$ after print for both polymers (PS H, PS R, PS ref, PE H, PE R, PE Ref).

Figure 5:
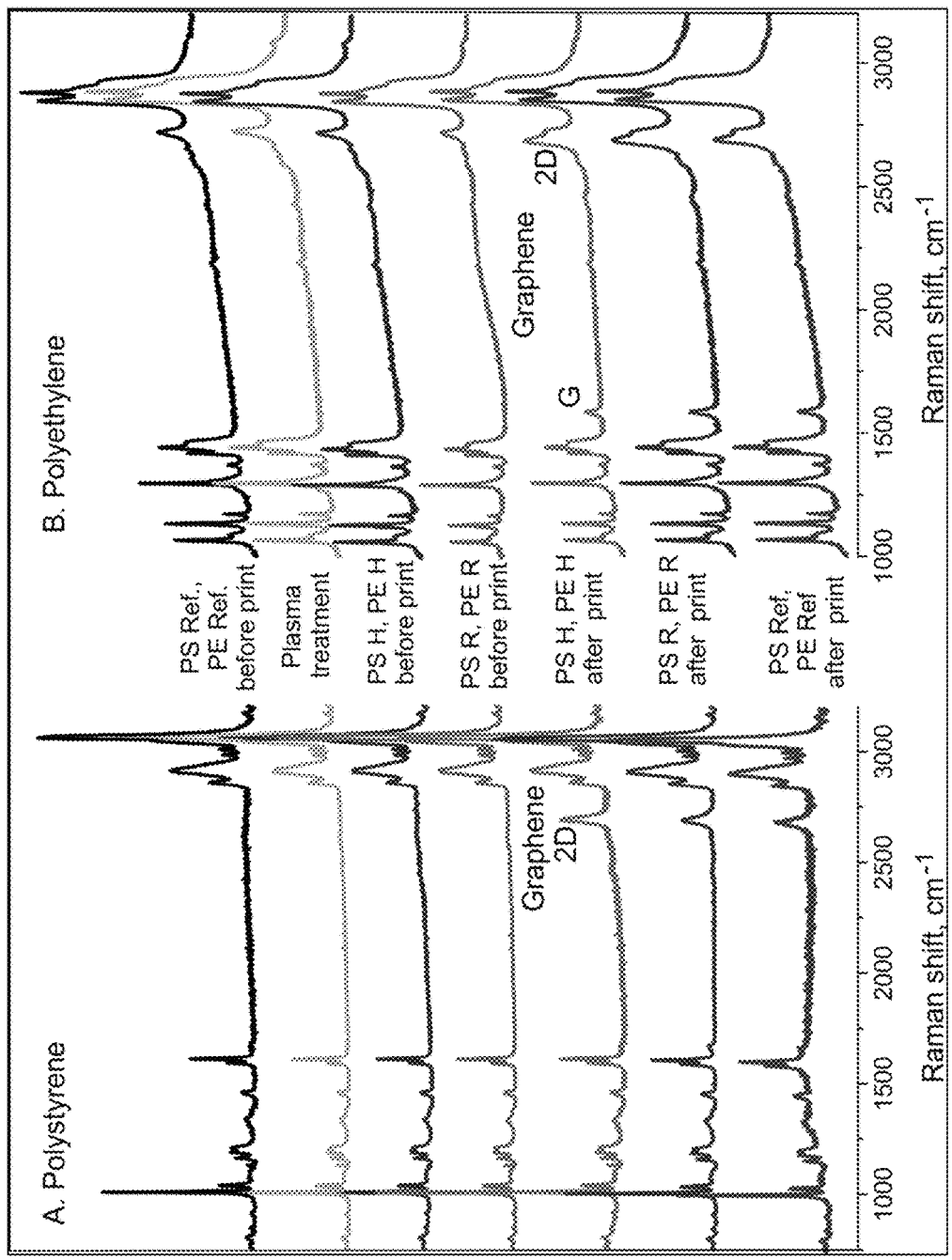
FIG. 5 shows Raman spectra of polystyrene and polyethylene before and after print.
Figure 7:
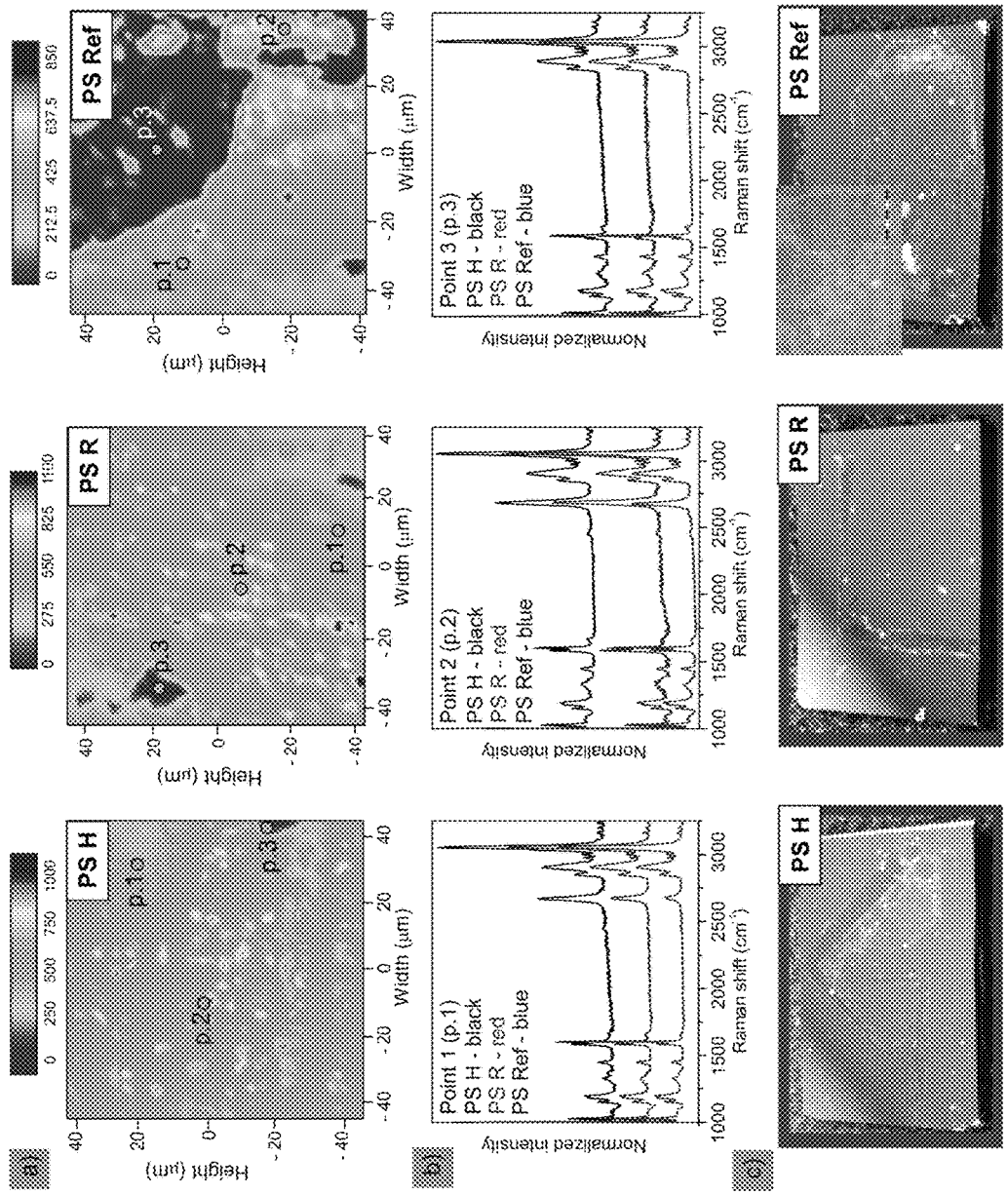
FIG. 7 shows (a) microraman maps of PS H, PS R and PS Ref after print, (b) the corresponding raman spectra at chosen points of each map, and 9 (c) optical photographs of the residual graphene left over on $SiO_2$/Si surface after graphene transfer to PS H, PS R and PS Ref. The inset in PS Ref optical photograph is microscope image over 1 mm area.
Figure 8:
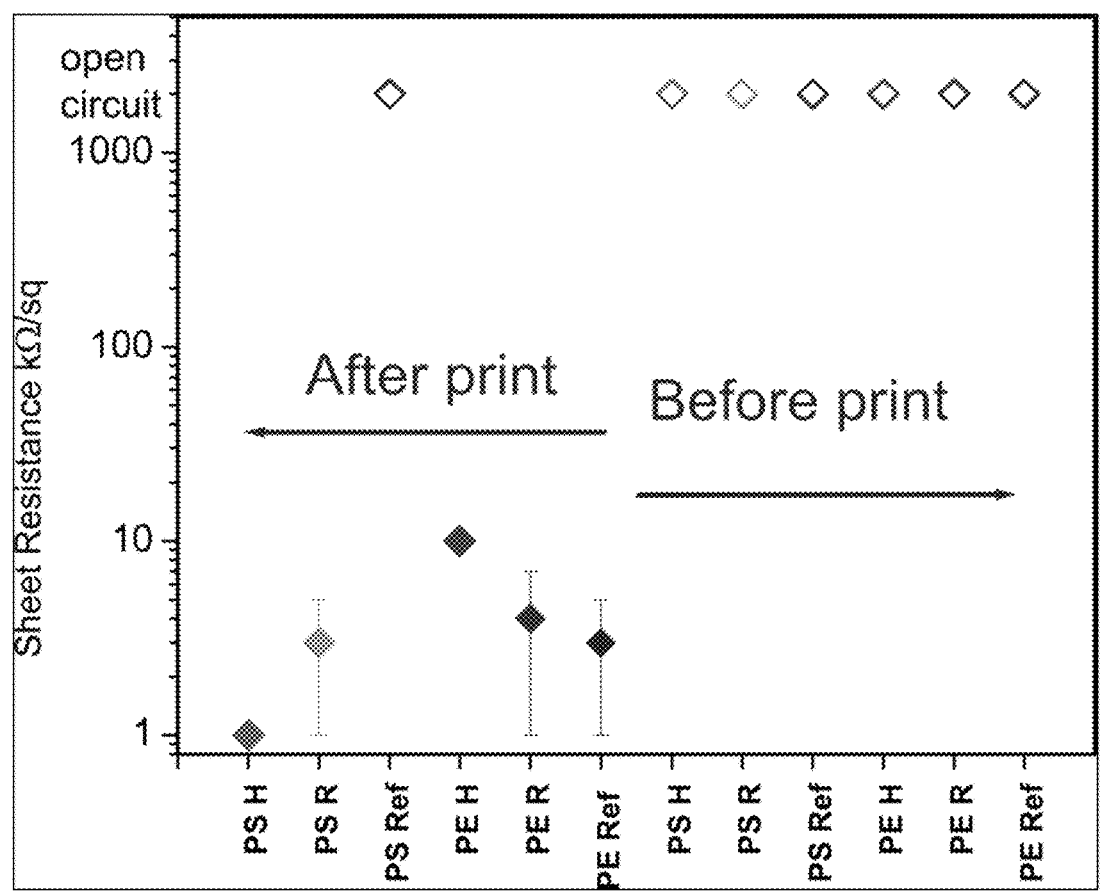
FIG. 8 shows sheet resistance of polystyrene and polyethylene before and after print.

While the Raman spectra shown in FIG. 5 clearly verify the successful transfer printing of graphene onto polymer substrates, it does not provide sufficient information about the uniformity of the printed graphene layer. Microraman mapping, shown in FIG. 7a of the 2D peak over 90 µm area was performed to better examine this issue in the case of polystyrene. The PS H and PS R show uniform coverage, which was not the case for PS-Ref. It should be noted that the polymer surface roughness after print over 50 µm scan area was ~1 µm suggesting very rough surface and thus intensity variation over large area is not surprising. To better characterize this phenomenon Raman spectra of selected points are plotted in FIG. 5b and based on these measurements we can conclude that intensity lower than 200 (dark blue color) corresponds to bare polymer. Intensities above that correspond to transferred graphene and the intensity or color variation (light blue to red) reflects the variation in morphology. Alternatively, the uniformity of the transferred graphene layer on macroscale can be evaluated by analyzing the graphene residuals on the Cu foil after transfer printing (FIG. 5c). This was accomplished by transferring the residuals from the printed Cu foil to Si using the wet transfer process described above. It is clear that full transfer of graphene onto the PS-H and PS-R substrates was achieved. In this work the polymer samples were smaller than the graphene/Cu substrates and so, the residues on the Si wafers are the edges of the Gr/Cu foil that did not come into contact with the polymer surface during print. In the case of PS Ref, only a partial transfer was observed and the microscope image (FIG. 5c inset) clearly shows graphene on the SiO$_2$/Si surface.

Samples were electrically characterized using a standard 4-probe station with 1 mm spaced probe tips. FIG. 5 shows the 4-probe sheet resistance of the samples before and after graphene transfer. The insulating polymer surface was indeed found to be conducting after transfer with low sheet resistances of 1 kΩ/sq (PS H) and 3 kΩ/sq (PS R). These values are consistent with the sheet resistance (~1 kΩ/sq) of monolayer graphene transferred to PET and SiO$_2$/Si (V. P. Verma et. al, *Large-area graphene on polymer film for flexible and transparent anode in field emission device*, Appl. Phys. Lett. 96, 203108 (2010); X. Li et al., *Transfer of large-area graphene films for high-performance transparent conductive electrodes*, Nano Lett., 9(12), 4359-4363 (2009); and J. W. Suk et. al, Transfer of SVD-Grown monolayer graphene onto arbitrary substrates, ACS Nano 5 (9), 6912-6924 (2011), the entire contents of each are incorporated herein by reference). The reference sample (PS Ref) did not show measurable conductivity, which is consistent with incomplete graphene transfer. The electrical conductivity, carrier densities and mobilities of the transferred graphene films for PS H and PS R were determined at 300 K by Hall measurements using copper pressure clips in a van der Pauw configuration over areas of 0.5×0.5 mm$^2$. The currents used for the measurements were 1 and 50 µA, while the magnetic field was approximately 2 kG. The measured conductivities were increased from ~10'S/m before print to ~5×10$^5$ S/m after print. The carrier densities for PS R and PS H were 1.6×10$^{13}$ cm$^{-2}$ and 5.6×10$^{12}$ cm$^{-2}$ respectively, with corresponding mobilities of 1140±71 cm$^2$/Vs. These values are on par or better than those reported for graphene transferred from SiC to SiO$_2$/Si (J. D. Caldwell et al., *Technique for the dry transfer of epitaxial graphene onto arbitrary substrates*, ACS Nano 4 (2), 1108-1114 (2010)), the entire contents of which is incorporated herein by reference) and the calculated values for graphene transferred from Cu foils to glass (J. W. Suk et. al, *Transfer of SVD-Grown monolayer graphene onto arbitrary substrates*, ACS Nano 5 (9), 6912-6924 (2011), the entire contents of which is incorporated herein by reference), suggesting the developed transfer method provides a promising route for graphene transfer to organics.

Understanding the graphene transfer to polystyrene and polyethylene references lies in analyzing the effects of the chosen printing conditions (150° C. and 500 psi) on the polymer structure. In the case of polystyrene, transfer was not uniform. Indeed there were large areas where no graphene was detected even though the printing occurs well above its glass transition temperature (100° C.) allowing for increased chain mobility. In the case of polyethylene, the transfer could be affected by the melted crystalline domains in the polymer (peak melting temperature of 137° C.) (S. M. Kurtz, *The UHMW PE Handbook: ultra-high molecular weight polyethylene in total joint replacement*, Elsevier Inc. San Diego Calif. (2004), the entire contents of which is incorporated herein by reference).

The experimental evidence suggests successful graphene transfer to both homopolymers—polyethylene and polystyrene. However, the sheet resistance measurements indicate that the coverage among different samples, and different polymers (PS vs. PE) is different. Successful graphene transfer may rely on the creation of uniform PFPA monolayer allowing for proper azide-groups presentation toward the graphene sheet before printing. The print to untreated polymers is governed by their microstructure and chemical composition.

The transfer printing results presented above are a clear indication that high quality monolayer graphene can be directly printed to a device appropriate substrate providing that the adhesion between the graphene/device substrate is higher than the growth/substrate adhesion. The developed method generates no chemical waste, allows the metal foils to be reused and causes no changes in the graphene electrical properties. The observed difference in the sheet resistance is linked to the graphene coverage. For a complete graphene coverage (PS H and PS R) very low sheet resistance were measured. Hydrogen bond on TFPA/polymer interface provided sufficient adhesion for graphene transfer. The synthesized azide molecule could be applied for coating of a wide range of organics thus extending the range of possible substrates to which graphene can be transferred. Similarly, other growth foils could be used as well.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A method for dry graphene transfer comprising:
   growing graphene on a growth substrate;

applying an electron beam generated $CO_2$ plasma to chemically modify a transfer substrate to enhance its adhesion to graphene;

depositing N-ethylamino-4-azidotetrafluorobenzoate (TFPA) with an $NH_2$ end group to the chemically modified transfer substrate, wherein the $NH_2$ end group attaches to the chemically modified transfer substrate leaving an azide end-group available to attach to the graphene, wherein said deposition comprises:

placing the chemically modified transfer substrate in a 4 mM TFPA solution for two hours;

rinsing the chemically modified transfer substrate after removal from the TFPA solution; and sonicating for 10 minutes in methanol the rinsed chemically modified transfer substrate;

contacting the graphene on the growth substrate with the azide end-group on the rinsed chemically modified transfer substrate and transfer printing; and separating the transfer substrate with attached graphene from the growth substrate.

2. The method of claim 1, wherein the plasma incorporates hydroxyls, carbonyls, carboxyls, and carbonates into the transfer substrate.

3. The method of claim 1, wherein the growth substrate comprises copper foil.

4. The method of claim 1, when the growth substrate comprises a transition metal foil.

5. The method of claim 4, wherein the transition metal foil comprises ruthenium, iridium, nickel, or any combination thereof.

6. The method of claim 1, wherein the growth substrate comprises silicon carbide or boron nitride.

7. The method of claim 1, wherein the transfer substrate comprises a polymer.

8. The method of claim 1, wherein the transfer substrate comprises a homopolymer.

9. The method of claim 1 wherein the transfer substrate comprises polystyrene, polyethylene, polypropylene, or any combination thereof.

10. The method of claim 1, wherein the transfer substrate comprises an oxygen containing polymer, a nitrogen containing polymer, or both.

11. The method of claim 1, wherein the transfer substrate comprises a polyester, polyacrylate, polycarbonate, or any combination thereof.

* * * * *